Inventor
Gaetan De Coye De Castelet
By Stevens, Davis, Miller & Mosher
Attorneys Inventor
Gaetan DeCoye De Castelet
By Stevens, Davis, Miller & Mosher
Attorneys

United States Patent Office 3,324,743
Patented June 13, 1967

3,324,743
POWERPLANTS FOR MOTOR VEHICLES
Gaëtan de Coye de Castelet, Billancourt, France, assignor to Regie Nationale des Usines Renault, Billancourt, France
Filed Dec. 28, 1964, Ser. No. 421,240
Claims priority, application France, Jan. 9, 1964, 959,777, Patent 1,389,603
6 Claims. (Cl. 74—700)

This invention relates to a powerplant for motor vehicles, of the type comprising a heat engine and a gearbox arranged on either side of a wheel-driving differential.

The invention is more particularly though not exclusively concerned with a form of embodiment of such a powerplant, essentially characterized in that the kinematic coupling between the engine and the gearbox is provided by a hydrokinetic device positioned at the free end of the gearbox and of which the impeller is connected to the engine shaft through a drive shaft internal to the corresponding shaft line of the gearbox, said hydrokinetic device being located in a stream of cooling air set up when the vehicle is moving.

Preferably, the hydrokinetic device is positioned forward of the remainder of the powerplant unit.

By the term "hydrokinetic" is to be understood most notably either a torquer or a hydraulic converter well-known per se.

By virtue of the special disposition referred to of the hydrokinetic device, the present invention offers a notable advantage in that this device can efficiently fulfill the function of an oil radiator for a part or the entirety of the transmission system. At the same time it permits reducing the degree of cantilever of the engine in relation to the wheel axle that would otherwise result from a conventional layout in which the hydrokinetic device is conjoined to the engine, for it is well-known that a cantilevered engine is in such cases detrimental to both road-holding and compactness. It should also be noted that, as compared to such a conventional layout, the layout according to the invention avoids the use of a case for surrounding the hydrokinetic device, which would otherwise be necessary for assembling the engine and the differential casing.

With the arrangement according to the invention, the existence of the shaft connecting the engine to the impeller of the hydrokinetic device facilitates the elimination of torsional vibration by reason of a possible degree of elasticity that may be imparted to that shaft.

In addition, the engine can be crankstarted from the hydrokinetic device end by engaging the crank onto the impeller.

Embodiments of the invention will now be more particularly described, by way of example, with reference to the accompanying drawings in which.

Figure 1:
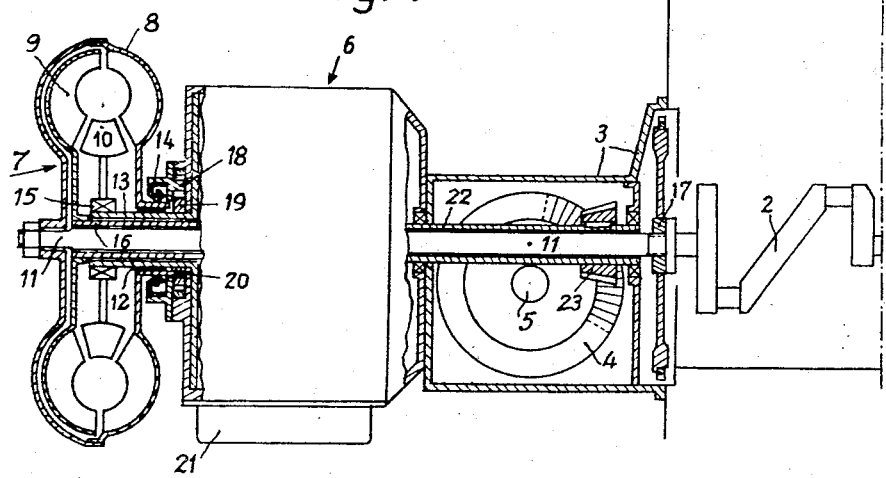
FIGURE 1 shows schematically in partial axial section a powerplant unit according to the invention.

The powerplant shown in FIGURE 1 comprises an engine 1 whose crankshaft is figuratively designated by the reference numeral 2. To the engine unit is assembled a differential casing 3, within which are schematically represented the crown-wheel 4 and one of the differential output shafts 5. On the side of the differential remote from the engine is disposed a gearbox generally designated by reference numeral 6, the case of which is assembled to the differential casing 3.

At the other end of the gearbox 6 is positioned a hydrokinetic device 7, shown in the example as being a conventional hydraulic torque converter comprising an impeller 8 forming the converter casing, a turbine 9 and a reactor 10.

The impeller 8 is fixed to the end of a drive shaft 11 through which it is coupled to the crankshaft 2. It is furthermore rotatably mounted as at 12 on a rear axle tube 13 assembled to the casing of gearbox 6, the leak-tightness of this rotating compound being ensured by a seal 14. The reactor 10 is likewise rotatably mounted on the tube 13 through the medium of a unidirectional coupling 15 well-known per se.

The turbine 9 is fixed to the end of a hollow shaft 16 forming the gearbox input shaft, which is coaxial with the shaft 11 extending through it and with the rear axle tube 13 surrounding it. The shaft 11 is in this case connected to the crankshaft by the engine-starting ring-gear hub 17 fixed to the end of the crankshaft, the shaft 11 being, say, fixedly screwed into said hub.

Manifestly, the gearbox 6 may be of any convenient design without departing from the scope of the invention, and the gearbox output shaft may surround the shaft 11 or be offset with respect thereto, depending on the type of gearbox used.

Futhermore, the oil circulation through the transmission may be provided in the conventional manner, and more particularly in this case by means of a pump 18 of known type with tangential gears, positioned on the side of the gearbox 6 and around the tube 13, and the driving pinion 19 of which is engaged by a driving peg 20 rigidly connected to the impeller. It should be noted that the transmission oil circuit which, depending on the differential design, may encompass if desired only the hydrokinetic device and the gearbox, is simplified by the side-by-side location of these two components in comparison with what it would be were the hydrokinetic device to be adjacent to the engine.

Figure 2:
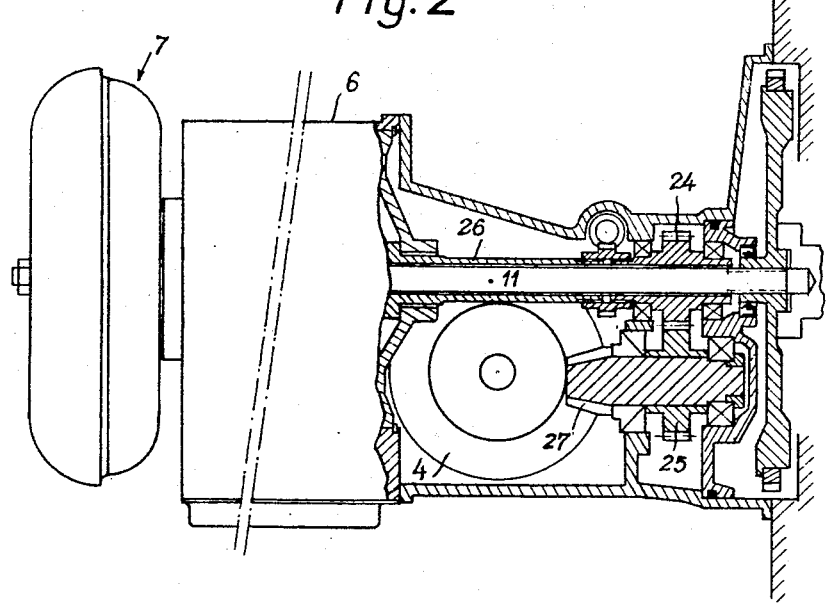
FIGURE 2 is a corresponding view of an alternative embodiment.

As is shown in the embodiment in FIGURES 1 and 2, which relate to the case of an epicyclic gearbox of any convenient design, the hydraulic circuit may be devised in the classic manner well-known to the specialist in the art, by connecting the pump 18 (through external conduits or through passages formed in the casing of gearbox 6) to a hydraulic power unit generally designated by numeral 21 which is affixed to the gearbox casing and which may be utilized in the customary manner, both for providing said oil circulation and for engaging the various gear ratios which can be obtained by the selective hydraulic control of the clutches and brakes included in this type of gearbox.

FIGURE 1 is illustrative of the case wherein the gearbox output shaft 22 itself supports the driving pinion 23 of the differential—which would be of the hypoid type —so that, because the differential would therefore require a lubricant of the so-called "extreme pressure" type which may be unsuitable for the torque converter and the gearbox, the oil circulation would be limited to these two latter-mentioned assemblies.

Reference is now had to FIGURE 2 for an example in which recourse is had to an intermediate gear coupling 24-25 between the gearbox output shaft 26 and the differential driving pinion 27, whereby the differential is of a type not requiring special lubricant and may therefore be included in the transmission oil circuit.

In the two constructional forms described precedingly, the differential driving pinion was positioned on the engine side with respect to the center of the differential, but it will readily be appreciated that it could be positioned on the gearbox side instead.

More generally, with a powerplant layout as hereinbefore described, the hydrokinetic device may thus be positioned fully in a cooling air stream set up when the vehicle is moving.

Figure 3:
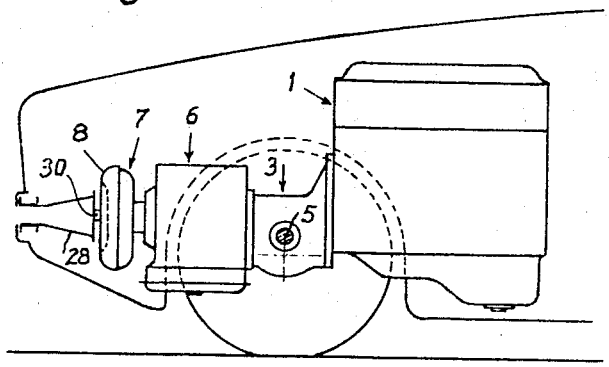
FIGURE 3 illustrates the disposition of a powerplant according to the invention in the front end of a vehicle.

Reference is next had to FIGURE 3 for a preferred location of the hydrokinetic device 7 at the front of the vehicle, the latter having a front engine which is assumed to be of the four-in-line cylinder type, with the impeller 8 receiving frontally and unobstructedly an air stream conveyed through a duct 28 whose intake is located in the zone of overpressure generated ahead of the vehicle when the latter is in motion. Thus, the hydrokinetic device 7 is able to efficiently fulfills its function of oil radiator for the transmission without the need to provide it with cooling fins.

Figure 4:
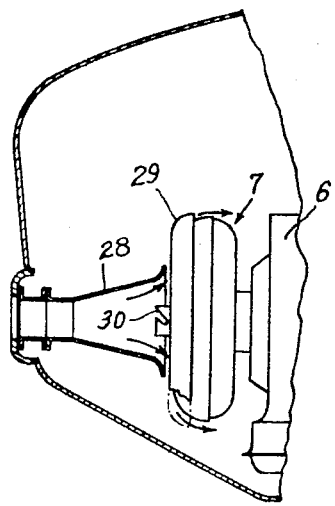
FIGURE 4 is a partial view of an alternative constructional form to that of FIGURE 3.

Referring lastly to FIGURE 4, it will be seen that it would alternatively be possible to associate to the fixed ventilation duct 28 a shroud 29 fitted round the case of the impeller 8, at the forward rim thereof and in spaced relation thereto, thereby providing flow passageways for the air stream through the duct 28.

In addition, as is clearly shown in FIGURES 3 and 4, the impeller 8, or a part used to mount the same on the end of the shaft 11, is slotted in the usual way as at 30 in order to enable the engine to be crank-started.

Figure 5:
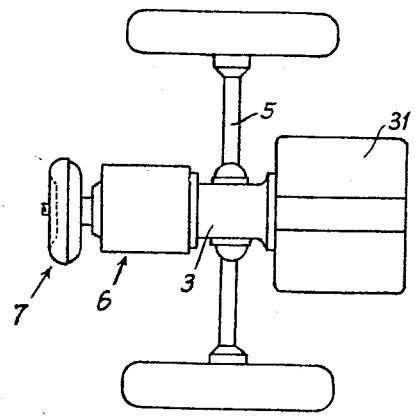
FIGURE 5 is a plan view of a different powerplant.

FIGURE 5 is included solely in order to illustrate the enhanced compactness of the layout according to the present invention, as used in association with a V-four engine 31.

I claim:
1. A powerplant unit for motor vehicles comprising an engine having a crankshaft, a wheel-driving differential one side of which is adjacent to said engine crankshaft, a gearbox disposed on the other side of said differential, shaft means operatively connecting said gearbox to said differential, a kinematic coupling between said engine and said gearbox, a hydrokinetic device forming said kinematic coupling, said hydrokinetic device comprising an impeller, a turbine, a reactor and means coaxial with said shaft means operatively connecting said impeller to said crankshaft, said hydrokinetic device being mounted on the side of said gearbox opposite to said differential.

2. A powerplant unit according to claim 1 in which said hydrokinetic device is positioned forwardly of the remainder of the powerplant unit so as to be cooled by the air stream set up when the vehicle is in motion.

3. A powerplant unit according to claim 1 in which means are provided on said impeller of said hydrokinetic device for engaging with an engine starting crank.

4. A powerplant unit according to claim 1 further comprising duct means for directing said cooling air stream onto said hydrokinetic device.

5. A powerplant unit according to claim 4 in which said duct means comprises a portion of an external casing of said hydrokinetic device, said casing portion being adjacent to said impeller and including cooling air intake means and means to distribute said cooling air over said impeller.

6. A powerplant unit according to claim 1 further comprising a hydraulic circuit having a hydraulic power generating unit, said circuit including said hydrokinetic device and said gearbox, said hydraulic power generating unit being mounted on said gearbox.

References Cited

UNITED STATES PATENTS

| | | | |
|---|---|---|---|
| 1,781,354 | 11/1930 | Van Ranst | 74—700 X |
| 2,075,084 | 3/1937 | Best | 74—700 X |
| 2,960,888 | 11/1960 | Flinn | 74—700 |

FRED C. MATTERN, Jr., *Primary Examiner.*

DAVID J. WILLIAMOWSKY, *Examiner.*

C. J. HUSAR, *Assistant Examiner.*